United States Patent [19]
Irving et al.

[11] 3,715,721
[45] Feb. 6, 1973

[54] VEHICLE STATION KEEPING DEVICE

[75] Inventors: Alexander Irving, Farnborough; Reginald Alfred Francis Priest, Crowthorne, both of England

[73] Assignee: National Research Development Corporation, London, England

[22] Filed: Feb. 23, 1971

[21] Appl. No.: 118,037

[52] U.S. Cl. .................340/62, 340/104, 353/13, 356/21
[51] Int. Cl. .................................B60q 1/00
[58] Field of Search ....340/62, 104, 103; 353/14, 13; 116/29; 356/21, 20, 251

[56] References Cited

UNITED STATES PATENTS

| 3,603,929 | 9/1971 | Drysdale | 340/104 |
| 3,469,234 | 9/1969 | Greacen | 340/62 |
| 2,738,753 | 3/1956 | Eubank | 353/14 |
| 2,405,731 | 8/1946 | Beggs et al. | 356/21 |
| 3,574,283 | 4/1971 | Albers | 356/251 |

Primary Examiner—John W. Caldwell
Assistant Examiner—Glen R. Swann, III
Attorney—Cushman, Darby and Cushman

[57] ABSTRACT

A vehicle station keeping device provided in which the images of two fiducial marks are projected to infinity so that they can be viewed by the driver of the vehicle. The marks can be moved either continuously or in discrete steps so that the spacing between the marks is proportional to the vehicle's speed.

12 Claims, 4 Drawing Figures

VEHICLE STATION KEEPING DEVICE

The invention relates to distance gauging devices for use in vehicles, and has as an object the provision of a device for enabling a driver of a vehicle to judge a safe following distance from a preceding vehicle.

It is to be understood that the term vehicle is intended to include sea and air craft as well as land vehicles, and the term driver is to be interpreted accordingly.

According to the invention there is provided a distance gauging device for use in a vehicle, comprising means for producing a pair of horizontally separated fiducial marks visible to the driver when looking ahead, and means for varying the separation of the marks in inverse relationship to the speed of the vehicle.

There may also be provided means for indicating the speed of the vehicle and projecting the said indication of the speed upon the field of vision of the driver.

The means for varying the separation of the marks may be such as to vary the separation of the marks continuously as the speed of the vehicle changes, or to vary the separation discontinuously in response to discrete changes of the speed of the vehicle.

Provision may also be made for adjusting the separation of the marks to allow for changes in the adhesion between the vehicle and a surface over which it is travelling.

Figure 1:
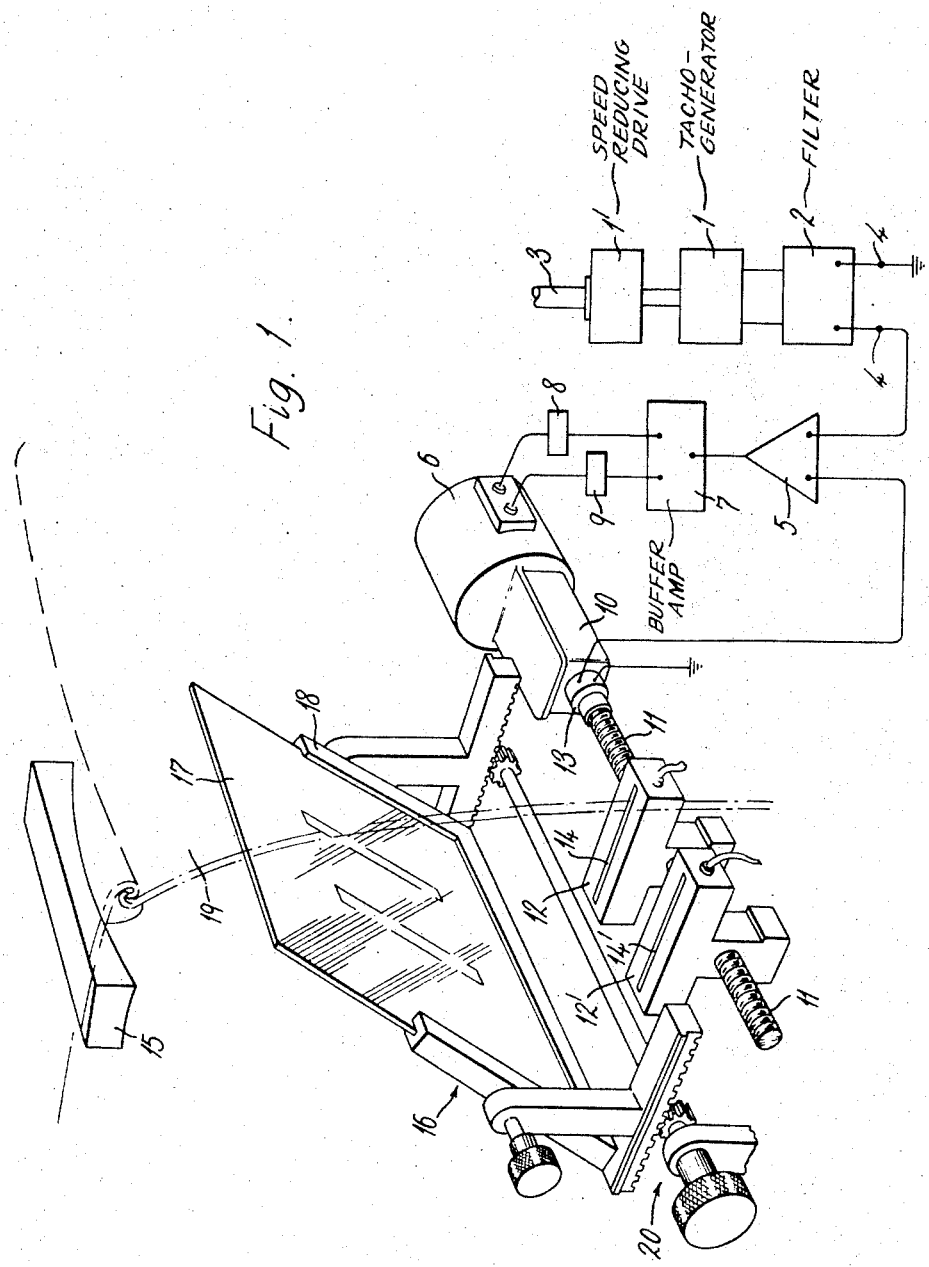
Figure 2:
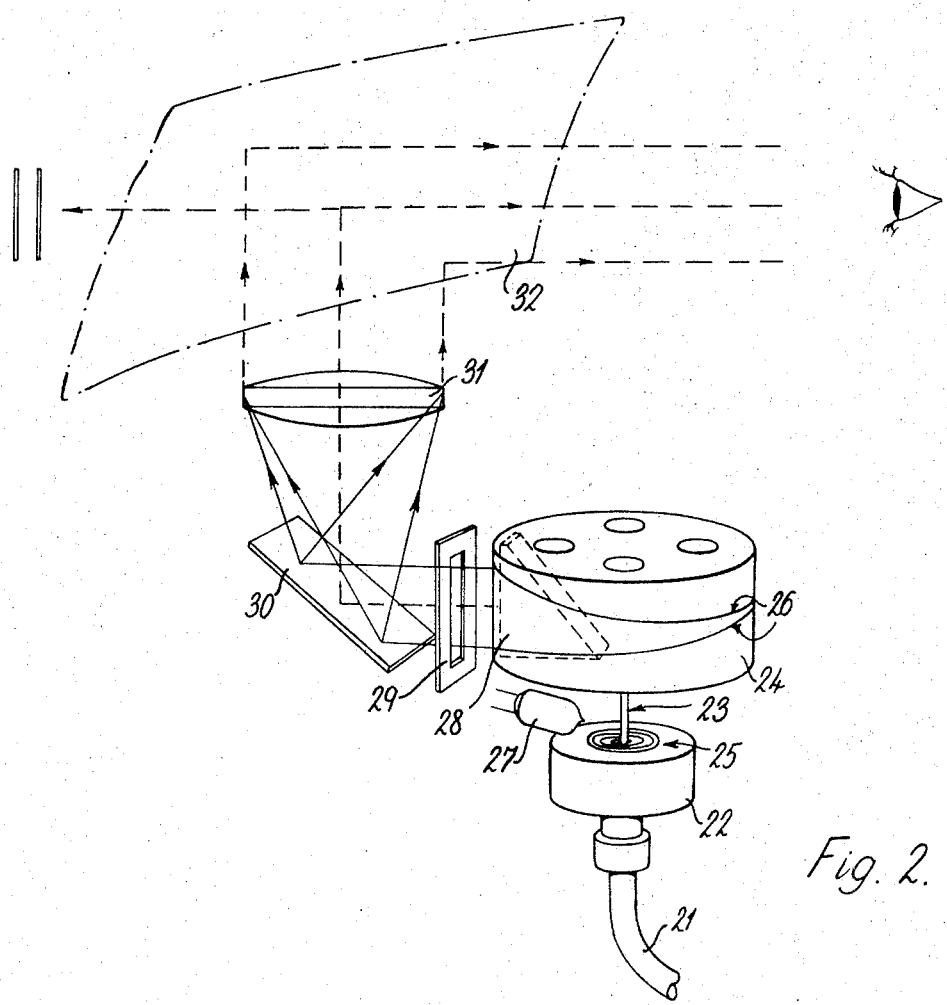
Figure 3:
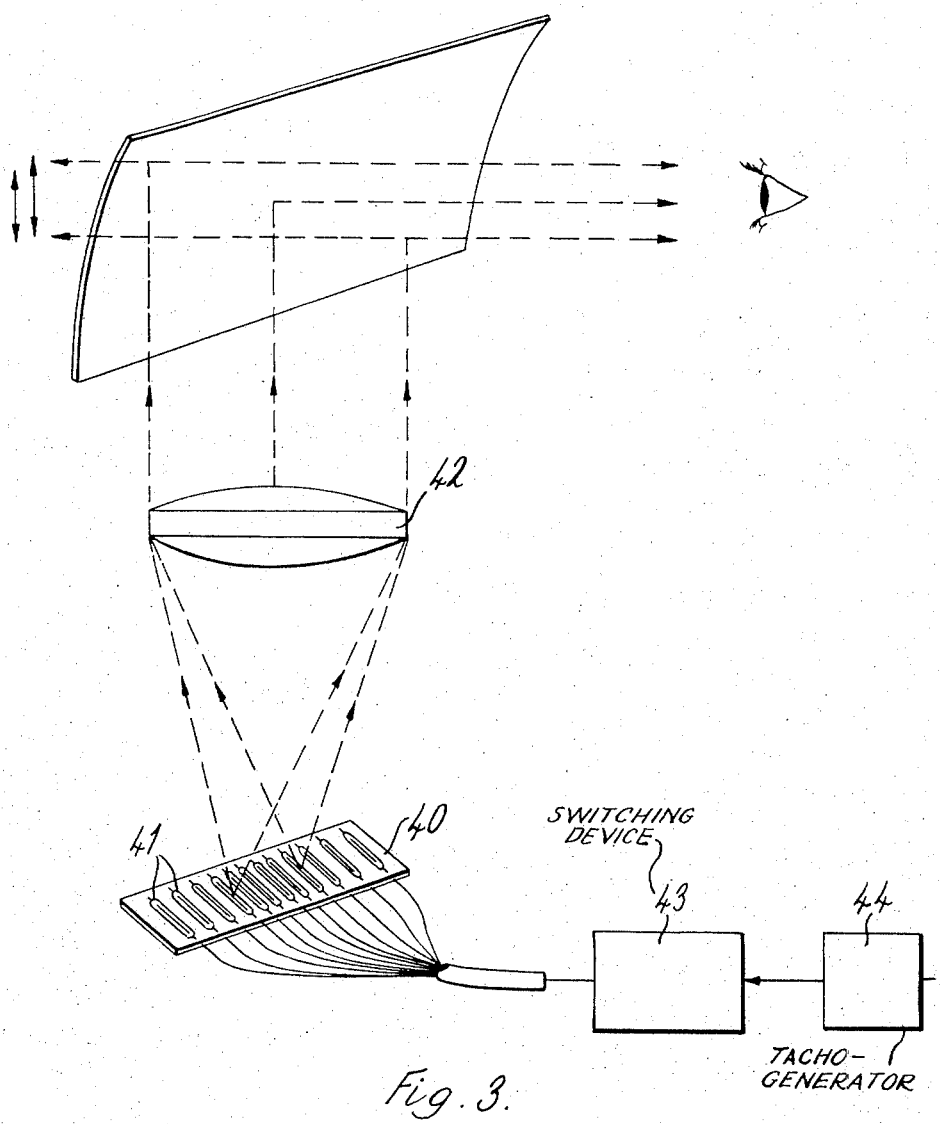
Figure 4:
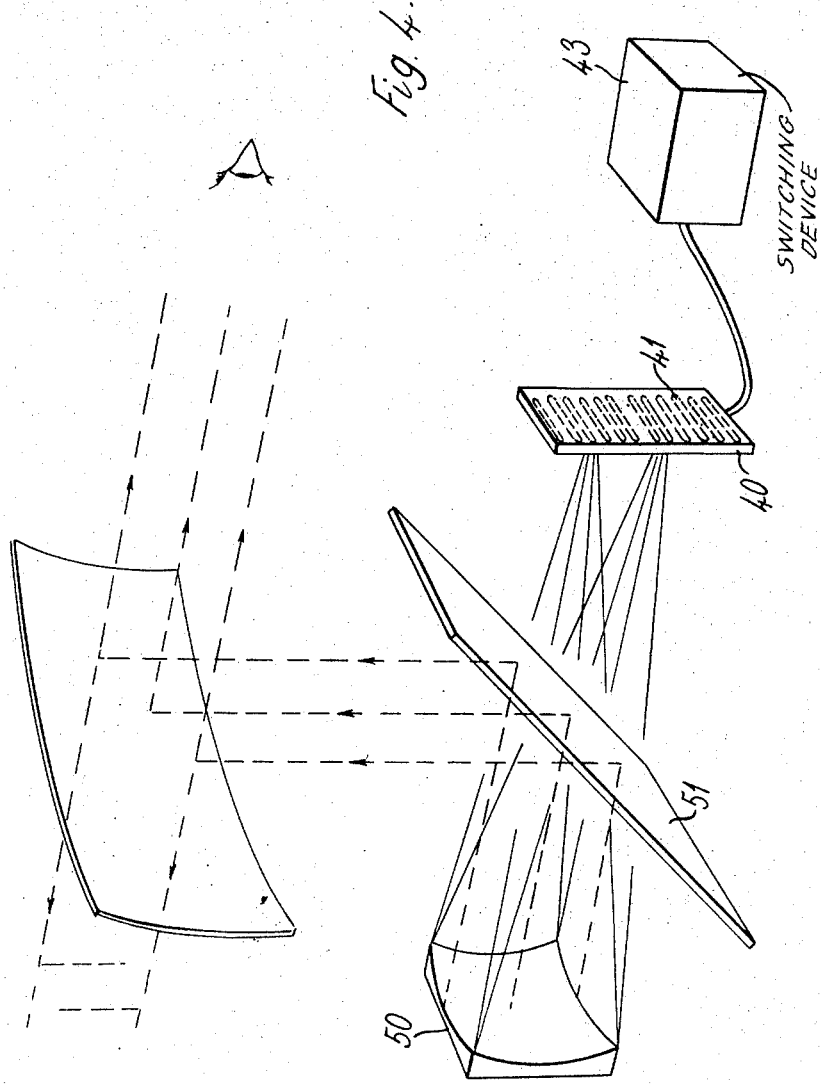

The invention will be described by way of example with reference to the accompanying drawings in which:

FIG. 1 is a partly perspective and partly diagrammatic view of a station keeping device for use in a motor vehicle, FIG. 2 is a similar view of a second embodiment, FIG. 3 is a similar view of a third embodiment, and FIG. 4 is a diagrammatic view of an embodiment using a mirror optical system.

Referring to FIG. 1, the station-keeping device includes a transducer consisting of a tacho-generator 1 together with an associated speed reduction drive 1' and a passive filter network 2. The transducer is arranged to be driven from a vehicle gear box, which is not shown, by means of a standard flexible drive cable 3 which is connected to the gear box at the speedometer drive output point. The transducer gives at its output terminals 4 a smoothed D.C. output signal which is applied to a servo system. The servo system consists of an operational amplifier 5 driving a reversible D.C. servo motor 6 through a buffer amplifier 7 and two relays 8 and 9. The D.C. servo motor 6 is connected to a reduction drive 10 to which is also connected a lead screw 11 having left and right hand screw threads upon which are mounted two identical lamp boxes 12 and 12' respectively, so that rotation of the lead screw 11 in one direction causes the lamp boxes 12 and 12' to approach each other and vice versa. The lead screw 11 also drives a feedback potentiometer 13 the output voltage from which is fed back to the input of the amplifier 5. Each lamp box contains a 12 volt festoon lamp (not shown) the light from which illuminates a white line graticule 14 or 14'. The relay 8 operates to cause the motor 6 to rotate the lead screw 11 in a direction to bring the lamp boxes 12 and 12' closer together and the relay 9 operates to cause the motor 6, and hence the lead screw 11, to rotate in the reverse direction, according to as to whether the signal from the transducer is increasing or decreasing. When neither relay is energized the system is in an equilibrium state. The arrangement is made such that the separation of the graticules 14 and 14' is inversely proportional to the speed of the vehicle.

A collimating optical system is used for viewing the two white line graticules 14 and 14' so as to produce as fiducial marks images of the graticules which appear to a driver of a vehicle to which the device is fitted to be at infinity. This is necessary to ensure that no change of focus is required by the driver's eyes when looking down the road ahead of the vehicle while simultaneously observing the fiducial marks. The optical system consists of a portion of a spherical mirror 15 about two inches wide cut from a blank of 6 inches diameter disposed above the lamp boxes 12 and 12' so that the graticules 14 and 14' lie in the focal plane of the mirror, and a combining screen 16 which consists of a flat rectangular plate 17 of transparent acrylic resin held in an adjustable frame 18 situated between the driver of the vehicle and its windscreen 19. The combining screen 16 reflects light from the graticules 14 and 14', after reflection by the mirror 15, so that the fiducial marks are superimposed on the normal field of the view of the driver. One side of the plate 17 is coated with titanium dioxide to increase its reflectivity while the other side is "bloomed" to decrease its reflectivity. This is done to remove the double image which would otherwise occur due to reflection from the front and back surfaces of the combining screen 16. The frame 18 of the combining screen is adjustable by means of a mechanism 20 which enables the screen 16 to be rotated and moved in fore and aft directions so as to accommodate variations in the stature of different drivers.

An automatic brightness control, which again is not illustrated, is provided to vary the intensity of the filaments of the lamps to accommodate for changes in the ambient brightness. It is not considered necessary to describe the brightness control in detail as such devices are well known.

Alternatively the servo system 6 may be so arranged that the lead screw 11 is only rotated by a predetermined amount in response to a predetermined change in the vehicle speed, a convenient change being five miles an hour, so that the separation of the graticules is varied discontinuously instead of continuously. Furthermore, a flat area could be incorporated into a windscreen to act as the combining screen and used in conjunction with an optical system arranged to project the image upwards.

The dimensions of the equipment are such as to give a separation between two vehicles of one car length (that is approximately 15 feet) per 10 miles an hour of road speed when the images are maintained in register with the extremities of a vehicle preceding that to which the device is fitted.

A figure of five feet has been assumed as the average width of motor vehicles. This figure is possibly an underestimate, but this tends towards giving an increased margin of safety when following large commercial vehicles.

Apart from motor cycles there are very few vehicles in use which are significantly less than 5 feet in width, and these (for example invalid carriages) are sufficiently slow moving and conspicuous as to make station-keeping impracticable.

The embodiment shown in FIG. 2 of the accompanying drawings also gives a continuous variation of the separation of the graticules. In this embodiment a cable drive 21 from the vehicle gear box is taken to a speedometer drag-cup movement 22 on the spindle 23 of which is mounted a drum 24 of spun aluminum. The spindle 23 is biassed in the usual manner by a hair spring 25. The drum 24 has a pair of non-parallel index lines 26 milled through it and a tungsten iodine lamp 27 is arranged below the drum 24 so that light from the bulb can fall on a prism 28 so that light from the bulb 27 is reflected radially outwardly by the prism 28 through the index lines 26. The light passing through the index lines 26 then passes through a sampling slot 29 and falls on a silvered mirror surface 30 which reflects the light on to a collimating lens 31. The optics of the system are arranged so that the index lines 26 lie in the focal plane of the collimating lens 31. The light from the lens 31 then falls on a combining screen 32 similar to the combining screen 16 described with reference to FIG. 1 of the accompanying drawings. Thus, as in the embodiment of FIG. 1 the driver of a vehicle to which the device is fitted will see the images of the index lines 26 at infinity. As the car's speed increases the speedometer movement 22 will rotate the drum 23 in such a manner that the images of the index lines will be seen to move together in a manner proportional to increase in the vehicle's speed; thus warning the driver of the vehicle that he must increase the separation between him and any vehicle he happens to be following.

In the embodiment shown in FIG. 3 the continuous movement of the fiducial marks seen by the driver is replaced by a sequence of discrete movements. This is achieved by using a matrix 40 of miniature festoon type lamps 41 mounted on a small panel in the focal plane of a collimating lens 42. Pairs of lamps 41 are switched in sequence by a switching device 43 in response to the vehicle speed. In this embodiment the switching device 43 is a digital voltmeter taking as its input an electrical signal from a tachogenerator 44 driven from the vehicle gear box in a suitable manner. When the vehicle moves from rest the outermost lamps 41 of the matrix 40 will be illuminated so that the driver of a vehicle to which this device is fitted will see a widely spaced pair of fiducial marks at infinity. As the speed of the vehicle increases, and as the output of the tachogenerator 44 increases, the switching device 43 will at predetermined increments switch successively more closely spaced pairs of the festoon lamps so that the marks viewed by the driver will appear to be stepped towards one another. For example, the lamps may be stepped for each 10 mile an hour variation in vehicle speed. Naturally, alternative methods may be used for switching the lamps 41 in the appropriate manner. For example, the speedometer of the vehicle could be used to engage a suitable sequence of microswitches or a speedometer movement similar to that described with reference to FIG. 2 could be used to control illumination of a sequence of photocells, each photocell controlling an appropriate pair of festoon lamps.

The embodiments described with reference to FIGS. 2 and 3 have involved the use of a collimating lens. However, it is, of course, entirely possible and may even be advantageous to replace the lens system with a mirror system and such an alternative arrangement is shown in FIG. 4. The mirror system of FIG. 4 will be described in association with a matrix of festoon lamps identical in operation to those of FIG. 3. However, it should be realized that the mirror system of FIG. 4 could be used equally well with the movement of FIG. 2. In FIG. 4 the matrix 40 of festoon lamps 41 is arranged in the focal plane of a spherical convex mirror 50 and semireflecting mirror 51 is arranged at 45° between the matrix 40 and the mirror 50. Light from the festoon lamps 41 passes through the semireflecting mirror 51 on the mirror 50 and is then reflected via the semireflecting mirror on to a combining screen similar to that described with reference to FIG. 1. Once again the driver of the vehicle will see images of whichever pair of festoon lamps is illuminated at infinity.

All the embodiments described in the specification have involved the use of a combining screen. However it could equally be perfectly possible to use the windscreen of the vehicle should it be a suitable shape. Naturally in this case it would be advantageous if the windscreen had a flat area through which the images of the index marks could be viewed. However, it is possible that the optics of the system might be arranged to compensate for a curved windscreen.

We claim:

1. A distance gauging device for use in a vehicle comprising:
    means for producing a pair of horizontally separated fiducial marks,
    means for projecting to infinity an image of the fiducial marks visible to a driver of the vehicle when looking ahead, and
    means for varying the separation of the marks in inverse relationship to the speed of the vehicle.

2. The device as described in claim 1, wherein means for projecting said fiducial marks includes an optical system and wherein the fiducial marks as seen by the driver are images projected to infinity.

3. The device as described in claim 2 wherein the fiducial marks comprise: a pair of non-parallel index lines, projected to infinity and wherein there further includes means for controlling the position of the index lines with respect to the optical system in response to the speed of the vehicle.

4. The device as described in claim 3 further including a drum in which the index lines are slot milled therein and a lamp is provided to illuminate the slots.

5. The device as described in claim 4 further including a speedometer movement having the drum adapted to be operatively mounted thereto so that the position of the drum varies in accordance with the speed of the vehicle.

6. The device as described in claim 1 including: means for varying the separation of the fiducial marks visible to the driver said variance is discontinuous in response to selected discrete changes of the speed of the vehicle.

7. The device as described in claim 6, further comprising: a matrix array of lamps, means for projecting said matrix to infinity to provide the fiducial marks and switching means for pairs of said lamps so that the spacing between switched pairs varies discontinuously in response to selected discrete changes of the speed of the vehicle.

8. The device as described in claim 7, including a tachogenerator driven in accordance with the speed of the vehicle for producing an output indicative thereof and the switching means comprises a digital voltmeter controlled in accordance with said tachogenerator output.

9. The device as described in claim 1 comprising:
a pair of illuminated graticules and lead screws each graticule mounted therein such that rotation of the lead screw in one direction causes the graticules to move together and rotation of the lead screw in the opposite direction causes the graticules to separate, servo means adopted for rotating the lead screw in such a manner that the separation of the graticules corresponds to the speed of the vehicle and means for producing an image of the graticules at infinity.

10. The device as described in claim 1 including: a combining screen on which the image of the fiducial marks is projected.

11. The apparatus as described in claim 1 including an illuminated lens for projecting the image of the fiducial marks to infinity.

12. The device as described in claim 1 including: a mirror system for projecting the image of the fiducial marks to infinity.

* * * * *